United States Patent
Wolf-Monheim

(10) Patent No.: US 10,427,481 B2
(45) Date of Patent: Oct. 1, 2019

(54) MOTOR VEHICLE WHEEL SUSPENSION

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Deaborn, MI (US)

( * ) Notice: Subject to any disclaimer, the term of this patent is extended or adjusted under 35 U.S.C. 154(b) by 43 days.

(21) Appl. No.: 15/204,347

(22) Filed: Jul. 7, 2016

(65) Prior Publication Data
US 2017/0008359 A1  Jan. 12, 2017

(30) Foreign Application Priority Data
Jul. 8, 2015 (DE) .......... 10 2015 212 743

(51) Int. Cl.
*B60G 7/00* (2006.01)
*B60G 7/02* (2006.01)
*B60G 3/10* (2006.01)

(52) U.S. Cl.
CPC .............. *B60G 7/001* (2013.01); *B60G 3/10* (2013.01); *B60G 7/02* (2013.01); *B60G 2204/143* (2013.01); *B60G 2204/4302* (2013.01); *B60G 2206/12* (2013.01); *B60G 2206/122* (2013.01); *B60G 2206/7101* (2013.01)

(58) Field of Classification Search
CPC . B60G 7/001; B60G 3/10; B60G 7/02; B60G 2206/7101; B60G 2206/122; B60G 2206/12; B60G 2204/143; B60G 2204/4302
See application file for complete search history.

(56) References Cited

U.S. PATENT DOCUMENTS

| | | | | |
|---|---|---|---|---|
| 2,973,955 A | * | 3/1961 | Brief | B60G 15/12 267/64.11 |
| 4,159,125 A | * | 6/1979 | Buchwald | B60G 3/06 180/253 |
| 4,400,008 A | * | 8/1983 | Rumpel | B60G 3/202 280/124.144 |
| 4,613,152 A | | 9/1986 | Booher | |
| 4,753,456 A | * | 6/1988 | Booher | B29C 70/52 280/124.134 |
| 4,768,807 A | | 9/1988 | McGibbon et al. | |

(Continued)

FOREIGN PATENT DOCUMENTS

| | | |
|---|---|---|
| DE | 3243434 A1 | 5/1984 |
| DE | 19942060 A1 | 3/2001 |

(Continued)

*Primary Examiner* — Darlene P Condra
(74) *Attorney, Agent, or Firm* — Raymond L. Coppiellie; Burgess Law Office, PLLC

(57) ABSTRACT

A wheel suspension for a motor vehicle including a control arm having a control arm portion and a cantilever spring portion fixed to the control arm portion. A retainer spaced from the control arm connects the cantilever spring portion to a vehicle subframe. The control arm portion may be made at least partly of fiber-reinforced plastic and having a wheel connecting point for a wheel carrier and at least one superstructure connecting point for a vehicle superstructure, for mounting pivotally about a pivot axis S. The spring portion may also be made at least partly from fiber-reinforced plastic.

18 Claims, 3 Drawing Sheets

(56) References Cited

U.S. PATENT DOCUMENTS

| | | | | |
|---|---|---|---|---|
| 4,772,044 A * | 9/1988 | Booher | ............... | B29C 70/52 267/149 |
| 4,802,659 A | 2/1989 | Hope | | |
| 5,667,206 A | 9/1997 | Chang | | |
| 7,083,199 B2 * | 8/2006 | Graber | ............... | B60G 7/001 280/5.507 |
| 7,380,831 B2 * | 6/2008 | Ziech | ............... | B60G 7/02 180/312 |
| 2005/0258614 A1 * | 11/2005 | Dove | ............... | B60G 3/20 280/124.141 |
| 2006/0046826 A1 * | 3/2006 | Gilmartin | ............... | B60G 3/28 463/19 |
| 2006/0181044 A1 * | 8/2006 | Zebolsky | ............... | B60G 7/006 280/86.75 |
| 2010/0117320 A1 * | 5/2010 | Grozev | ............... | B60G 11/58 280/124.16 |
| 2012/0315414 A1 * | 12/2012 | Wesch | ............... | B60G 7/001 428/34.1 |
| 2014/0046502 A1 * | 2/2014 | Schmitt | ............... | B60G 11/00 701/1 |
| 2014/0167339 A1 * | 6/2014 | Wagner | ............... | B60G 11/08 267/260 |
| 2014/0353937 A1 | 12/2014 | Girelli Consolaro et al. | | |
| 2014/0367951 A1 * | 12/2014 | Barr | ............... | B62D 21/11 280/781 |
| 2015/0008654 A1 * | 1/2015 | Haselhorst | ............... | B60G 7/001 280/124.128 |

FOREIGN PATENT DOCUMENTS

| | | |
|---|---|---|
| DE | 102008015705 A1 | 1/2010 |
| DE | 102011010367 A1 | 8/2012 |
| DE | 202014101981 U1 | 6/2014 |
| DE | 102013209648 A1 | 11/2014 |
| EP | 1378382 B1 | 3/2006 |
| EP | 1535766 B1 | 9/2011 |
| WO | WO002014145585 A1 | 9/2014 |

* cited by examiner

MOTOR VEHICLE WHEEL SUSPENSION

CROSS-REFERENCE TO RELATED APPLICATIONS

Not applicable.

BACKGROUND OF THE INVENTION

1. Field of the Invention

The present invention relates to a motor vehicle wheel suspension, and more specifically, to a suspension including a control arm and spring portion.

2. Description of Related Art

Motor vehicle wheel suspensions typically include as a component a transverse control arm. The transverse control arm connects the wheel carrier to the vehicle superstructure, in other words the chassis, bodywork, or subframe. Normally, the control arm has one (2-point control arm) or two (wishbone) connecting points on the superstructure side and a wheel-side connecting point. With a wishbone, in a fitted state the connecting points on the superstructure side, which achieve an articulated connection using a metal-rubber composite bearing, normally line up with the X-axis (in other words the longitudinal axis) of the vehicle, so a pivot movement of the wheel-side connecting point in the Y-Z plane is possible. The main function of the transverse control arm, together with the other suspension components, is to absorb horizontal forces, in other words in the X-Y plane.

Control arms are normally made of light alloy or steel, including a sheet-metal forming having a single-dish or double-dish structure. To save weight, control arms of fiber composites have been developed, where fibers of different types for example carbon fibers, glass fibers or aramide fibers are bonded into a plastic matrix.

A vehicle wheel suspension may also include a spring. One common form is a coil spring that extends between the control arm or wheel carrier and the vehicle superstructure or frame. In addition, leaf springs are also used, for example, the leaf spring is connected to the vehicle superstructure at one or more points and to the control arm or wheel carrier at a further point. Besides metal leaf springs (made of spring steel), plastic springs are known, in particular made of fiber-reinforced plastic. The latter are also advantageous with regard to weight saving.

Further, a transverse control arm may function as a spring. For example, the transverse control arm may include an elastic material, normally of fiber-reinforced plastic, so it can provide the springing of the wheel carrier. The transverse control arm is not pivotally mounted on the superstructure side but is fixed to the vehicle superstructure so a vertical movement of the wheel carrier attached to the transverse control arm is possible substantially only by elastic deformation of the control arm. Although this design is helpful because of weight-saving and a reduction in the number of components, nonetheless it means a compromise between an optimum steering function on one side—which requires a rigid component—and optimum springing on the other, which requires an elastic component.

SUMMARY OF THE INVENTION

A wheel suspension including a control arm having a control arm portion and a cantilever spring portion fixed to the control arm portion. A spring connecting assembly spaced from the control arm connects the cantilever spring portion to a vehicle subframe.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
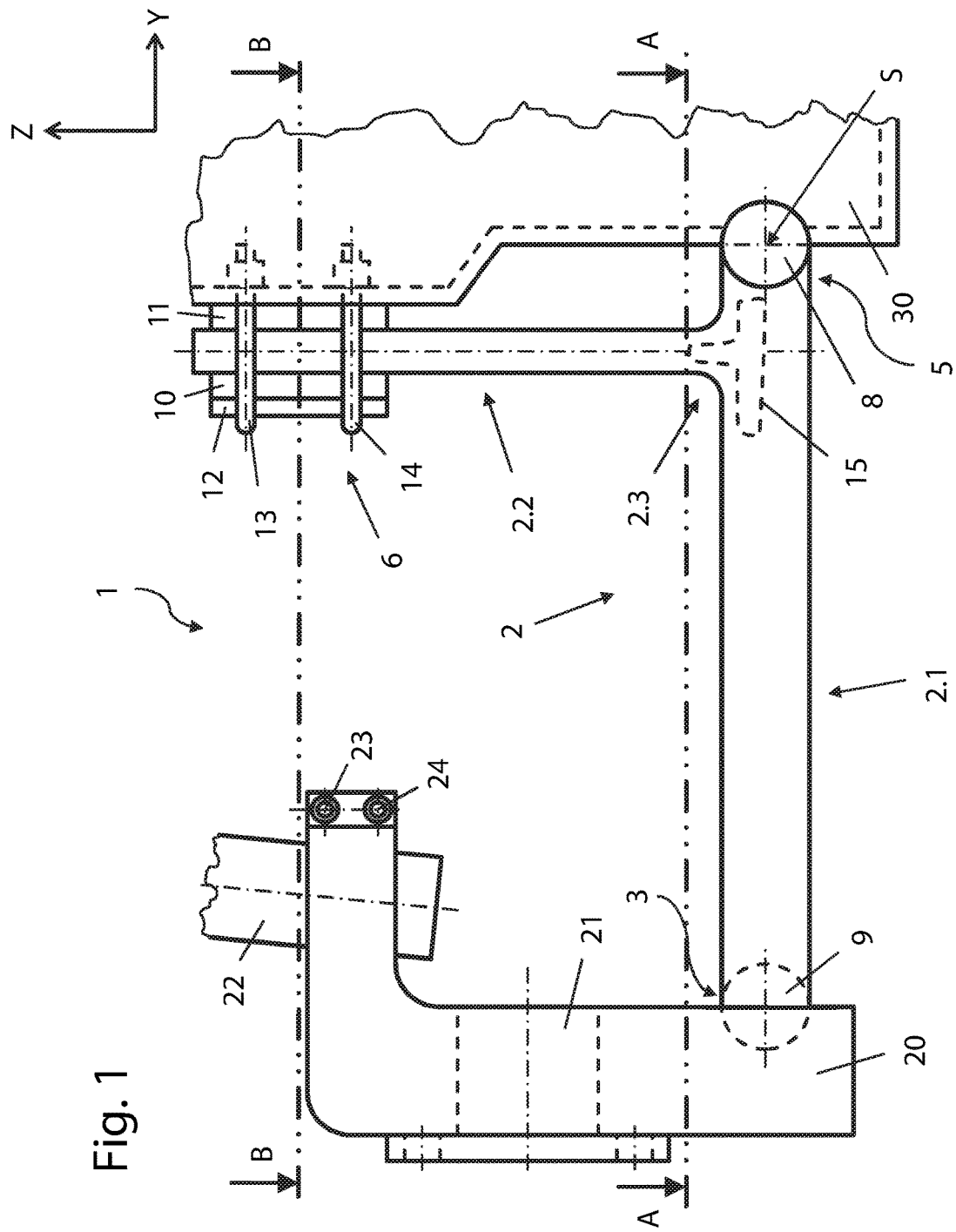
FIG. 1 shows a diagrammatic depiction of a wheel suspension according to the invention.

The following description of the preferred embodiment(s) is merely exemplary in nature and is in no way intended to limit the invention, its application, or uses.

In the different figures, the same parts always carry the same reference numerals, so these are usually only described once.

FIG. 1 shows a diagrammatic depiction of a wheel suspension 1 of a motor vehicle according to one example of the present invention. The term "wheel suspension" does not necessarily include all components for suspension of a vehicle wheel. Some embodiments may be referred to as wheel suspension components or wheel suspension assemblies. The wheel suspension may be for a front wheel or a rear wheel.

Figure 2:
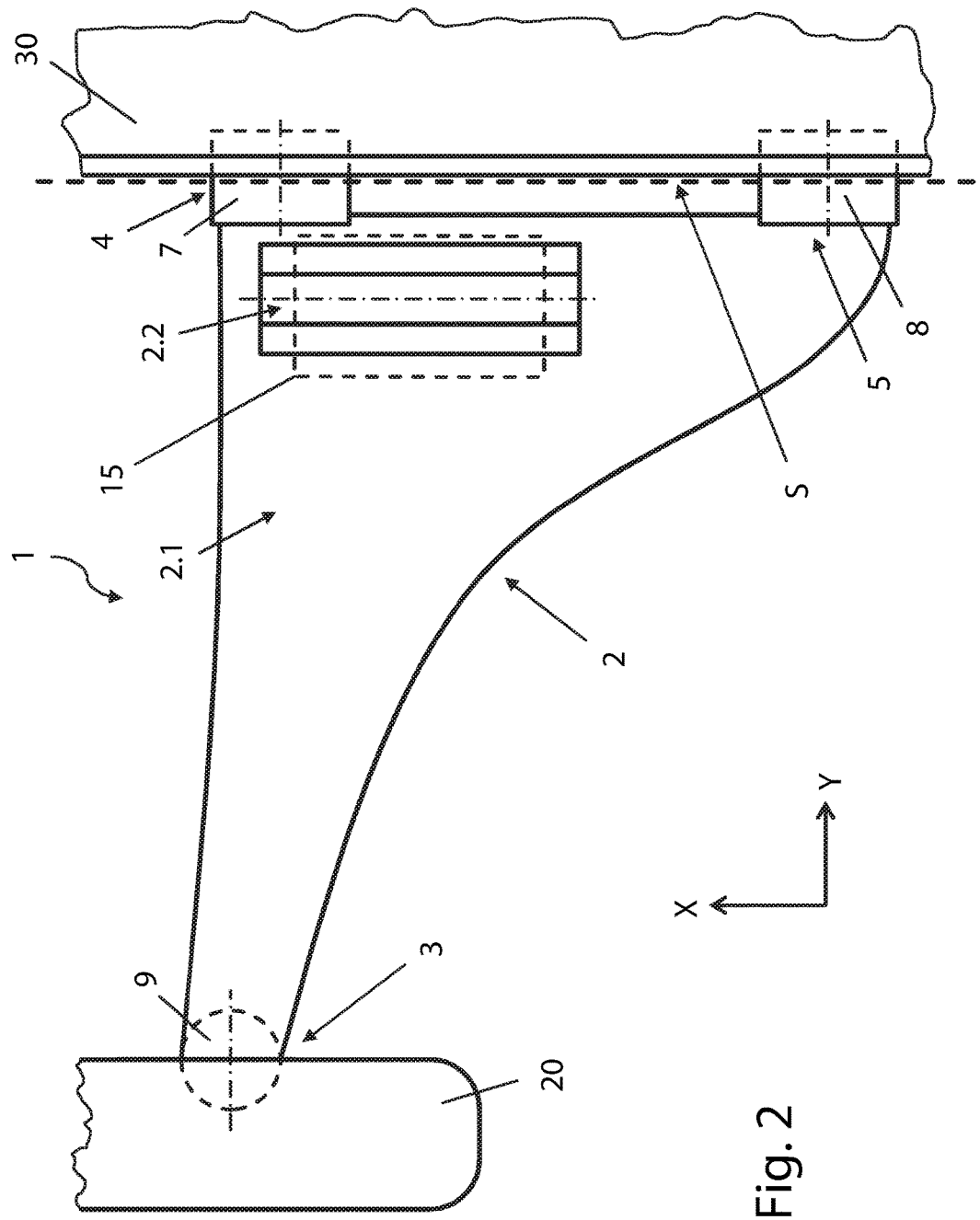
FIG. 2 shows a section view of the wheel suspension from FIG. 1 along line A-A.
Figure 3:
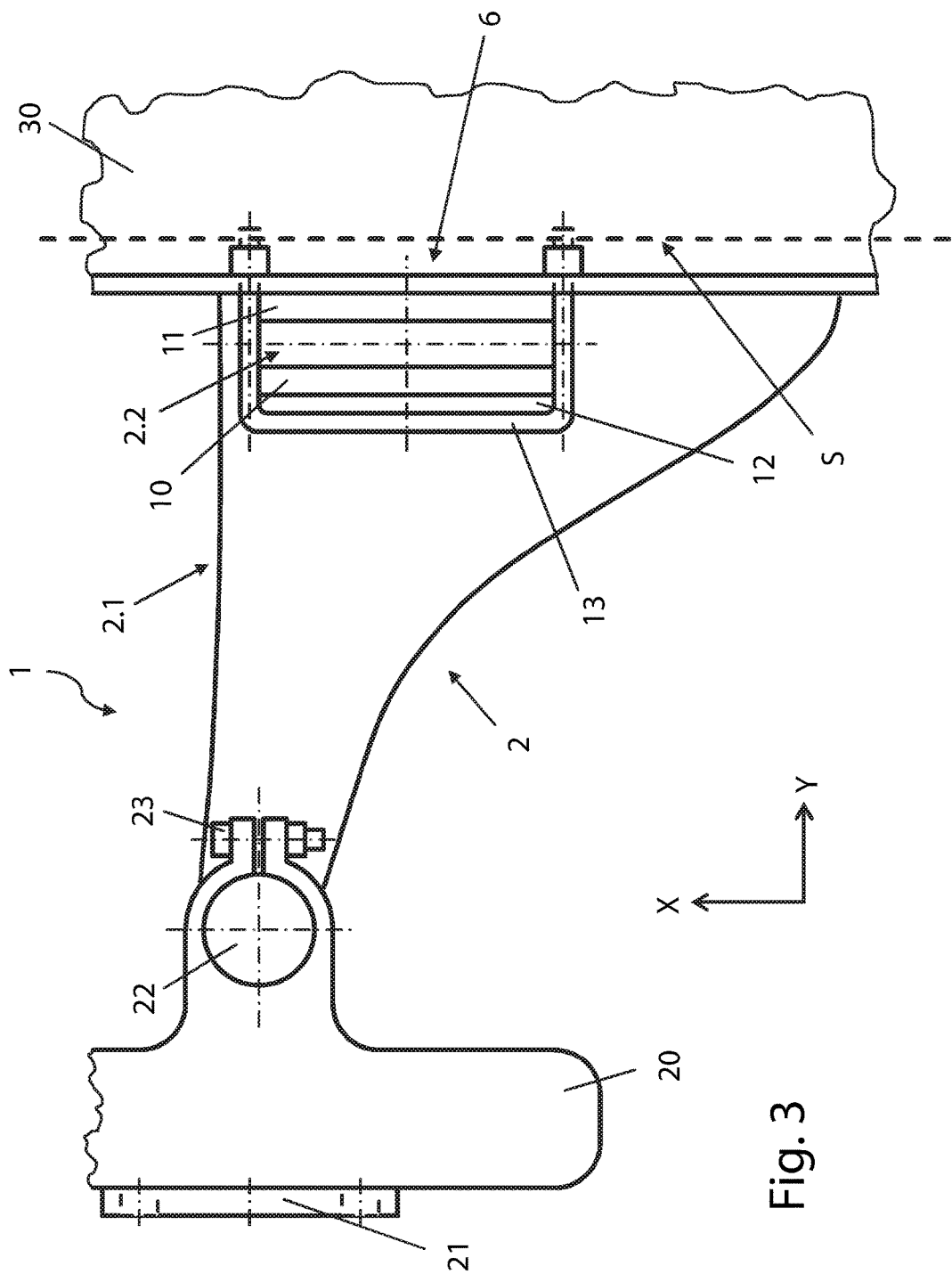
FIG. 3 shows a section view of the wheel suspension from FIG. 1 along line B-B.

FIGS. 2 and 3 are section views taken from FIG. 1. The direction of view here in FIG. 1 is along the X-axis (longitudinal axis of the vehicle) and in FIGS. 2 and 3 along the Z-axis (height axis). A central element of the wheel suspension is a control arm unit 2, pivotally mounted on a subframe 30, through two pivot bearings 7, 8, shown as front pivot bearing 7 and rear pivot bearing 8.

In one example the control arm unit 2 includes a control arm portion 2.1 made, at least partly, of fiber-reinforced plastic. The control arm unit 2 includes a wheel connecting point 3 for a wheel carrier 20 and at least one superstructure connecting point 4, 5 for pivotally mounting the control arm unit 2 on a vehicle superstructure, shown in the present example as the subframe 30, about a pivot axis S. The term "unit" does not necessarily mean it forms an integral whole. The control arm portion 2.1 and also the control arm unit 2 guides the wheel carrier 20 relative to the subframe 30, where the pivot movement of the control arm portion 2.1 about the pivot axis S allows movement of the wheel carrier 20. Ideally, the control arm unit 2 absorbs any forces between the wheel carrier 20 and the subframe 30 acting along the pivot axis S, and suppresses a relative movement along the pivot axis S.

The control arm portion 2.1 is made at least partly from a fiber-reinforced plastic. The fiber-reinforced plastic may include several different plastics and/or different fibers. For example, it would be conceivable that different fibers are arranged above each other in various layers. In principle, the fibers may be woven or non-woven, aligned or non-aligned. It is however preferred that the fibers are aligned so their alignment influences the stiffness of the control arm portion 2.1 in a targeted fashion. The packing density and/or material of the fibers and by the plastic material itself (in other words by the fiber and matrix or resin) may also influence the stiffness. It is also possible to use different densities, alignments, and/or materials for the fibers depending on location. In contrast to a metal part, the fiber-reinforced plastic may be non-homogeneous.

Preferably, the fiber-reinforced plastic includes carbon fibers, glass fibers, and/or aramide fibers. In addition, other fibers may be used; in particular—as stated above—fibers of different types may be mixed or arranged above each other in different layers.

As shown in FIG. 1 pivot axis S, coincides with the X-axis whereby one of the pivot bearings is hidden by the other. The subframe 30 is part of the vehicle superstructure (not otherwise shown), and the pivot bearings 7, 8 form superstructure connecting points 4, 5.

The pivot axis S runs horizontally, in other words in the plane spanned by the X and Y axes of the motor vehicle. Often, there are many, in particular two, superstructure connecting points spaced apart from each other along the pivot axis S. Additional wheel connecting points are also conceivable. The term "vehicle superstructure" is a collective term for bodywork, a chassis, a self-supporting body, and in some cases a subframe. The connection, for example, uses elastic bearings, in particular rubber-metal bearings. Otherwise, the control arm portion is preferably a rigid member; i.e., in normal operation of the vehicle, no or only insignificant deformation of the control arm portion 2.1 happens.

The control arm portion 2.1 of the control arm unit 2 extends along the Y-axis (transverse axis) of the vehicle to a ball joint 9, forming a wheel connecting point 3 at which the control arm unit 2 is connected to a wheel carrier 20. In the present example, the control arm unit 2 includes a spring portion 2.2. As shown the spring portion 2.2 is a cantilever spring or flat spring such as a leaf spring. The spring portion 2.2 is a resilient member, shown herein as having a rectangular cross-section, see FIG. 2, made at least partly from fiber-reinforced plastic, connected rigidly by material fit to the control arm portion, and has a spring connecting point or retainer 6 spaced from the pivot axis S for retaining one end of the spring portion 2.2 to the vehicle subframe 30. The spring portion 2.2 is rigidly connected to the control arm portion 2.1, whereby movement of the control arm portion 2.1 is transmitted directly to the adjacent part of the spring portion 2.2. The two portions 2.1, 2.2 move uniformly, at least in the region where they are connected by material fit to each other.

The spring portion 2.2 is connected to the control arm portion 2.1 and to the vehicle subframe 30 through the spring connecting point or retainer 6. As shown, the spring connecting point 6 is spaced from the pivot axis S, meaning there is a distance from the at least one superstructure connecting point 4, 5 and that the spring connecting point 6 is spaced from the (theoretically infinitely extended) pivot axis S transversely thereto. Pivot movement of the control arm portion 2.1 deforms the spring portion 2.2 causing a return force acting between the vehicle subframe 30 and the control arm portion 2.1, and between the vehicle 30 and the wheel carrier 20. The spring portion 2.2 is configured elastically, wherein the term "elastic" should be considered relative to the control arm portion 2.1 and in relation to the forces normally occurring. While the control arm portion 2.1 deforms at most imperceptibly under the forces occurring during normal operation, a perceptible deformation of the spring portion 2.2 occurs. For example, the bending resistance of the control arm portion 2.1 in relation to the bending moments relative to the pivot axis S may be substantially greater than that of the spring portion 2.2. Such a bending moment naturally results from a movement of the vehicle subframe 30 relative to the wheel carrier 20 on suspension compression.

Preferably, the control arm unit 2 is a transverse control arm where the pivot axis S corresponds to the X-axis of the motor vehicle. More precisely, the control arm portion 2.1 corresponds to the transverse control arm. The control arm portion may be L-shaped or bent in the same way as a conventional control arm, where a first and a second superstructure connecting point and a wheel connecting point are provided. The control arm portion may extend substantially in a plane formed by said connecting points.

The control arm unit 2 may fulfill the function of a lower control arm arranged below the rotational axis of the vehicle wheel. In particular, but not exclusively, it is preferable if the spring connecting point 6 is above the pivot axis S. In the described example, normally very little construction space is present below the pivot axis S and a spring connecting point 6 above the pivot axis S allows the production of a longer spring portion 2.2 the elastic properties of which may then be optimized more easily.

In a known fashion, a wheel hub 21 (shown highly diagrammatically) is mounted rotatably on the wheel carrier 20.

The wheel suspension may include various further components like, for example, a wheel carrier, a wheel attached to the wheel carrier, further control arms that sit on the wheel carrier (longitudinal or transverse control arms), a shock absorber, and parts of a vehicle superstructure to which the control arm unit is connected. While the return force provided by the spring portion 2.2 is enough for the springing of the vehicle wheel, it is conceivable to provide at least one additional conventionally designed spring. It is also conceivable that a wheel suspension includes a plurality of control arm units 2 according to the invention.

As shown, two holders 23, 24 rigidly connect the wheel carrier to a shock absorber 22. But, the shock absorber 22 is not—as normal in the prior art—surrounded concentrically by a coil spring. Rather, the spring portion 2.2 of the control arm unit 2 performs the spring function.

The spring arm portion 2.2 starts from the control portion 2.1 in a transitional region 2.3, in the region of the pivot axis S, and extends almost at right angles thereto. The control arm portion 2.1 and the spring portion 2.2 are made integrally from fiber-reinforced plastic. For example, carbon fibers, glass fibers, aramide fibers, or mixtures thereof may be used as fibers. The fibers may be prepared as a woven fabric, non-woven fabric or in another form, and may be impregnated, sprayed, or over-cast with plastic or resin in a corresponding mold.

The spring portion 2.2 includes, at least partially, fiber-reinforced plastic. In the same way as the control arm portion 2.1, the spring portion 2.2 may be configured very light but nonetheless stable, so the control arm unit 2 is light and stable. It is advantageous that the unit has two portions 2.1, 2.2 with different functions, each of which optimized for their respective functions. The control arm portion 2.1 can be optimized first in geometry and second regarding the materials used (plastic and/or embedded fibers) for guiding the wheel carrier 20. Similarly, the spring portion 2.2 can be optimized for its function, namely providing a suitable return force on suspension compression of the wheel. Compromises need not be made since the spring portion 2.2 normally has no function of guiding the wheel carrier 20. In addition, the control arm portion 2.1 can be adapted for its function with regard to the plastic used and with regard to the embedded fibers. Naturally, an optimization through the geometry of the control arm portion is also possible.

The spring portion 2.2 is connected to the subframe 30 at a spring connecting point 6. The spring portion 2.2 is elastically mounted, in that rubber elements 10, 11 are arranged between the spring portion 2.2 and the subframe 30, and between a metal plate 12 secured by clamps 13, 14 to the subframe 30 and the spring portion 2.2. The rubber elements 10, 11 provide the spring portion 2.2 with limited movement in the region of the spring connecting point 6.

In the disclosed example, the spring arm 2.2 is mounted adjacent or near the pivot axis S such that as the control arm portion 2.1 pivots or moves upward about the pivot axis S the part of spring portion 2.2 in the transition region 2.3 moves upward, in the Z-direction and to the right, in the Y-direction, creating a torsional or bending moment in the spring portion 2.2 and creating a force acting on the rubber elements 10, 11. If the limited movement of the rubber elements 10, 11 in the spring connecting point 6 is exceeded, further wheel load causes additional deformation/bending of the spring portion 2.2. In addition, the end of the spring portion 2.2 opposite the transition zone 2.3 could be slidably received between the rubber elements 10, 11 whereby the end moves longitudinally between the rubber elements 10, 11 when the control arm pivots about the pivot axis S. Since the end of the spring portion 2.2 positioned adjacent the rubber elements 10, 11 is constrained from movement in the Y-direction rotation of the control arm portion 2.1 about the pivot axis S causes bending or deformation in the spring portion 2.2. The change in position or movement of the transition region 2.3 with respect to the pivot axis S along with the spring force of the spring portion 2.2 factor into the return force of the wheel suspension.

The spring portion 2.2 may have different forms and for example be straight, or it may be bent once or several times. For example, the spring portion 2.2 in its unloaded state may be bent so it is straight under the load of the vehicle in fitted state. Its cross section between the control arm portion 2.1 and the spring connecting point 2.3 may be constant or varied, whereby deformation behavior can be influenced in a targeted fashion.

Preferably, the spring portion 2.2 extends at an angle between 60° and 120° over a plane running through the pivot axis and the wheel connecting point, also called the "plane of the control arm portion." The angle may be approximately a right angle and lie between 80° and 100°. In the disclosed example, the spring portion 2.2 and the control arm portion 2.1 form a T-shaped or L-shaped structure. If the control arm portion 2.1 extends horizontally, the spring portion 2.2 extends upward or downward, in particular vertically.

Although the control arm portion 2.1 and the spring portion 2.2 are each made of fiber-reinforced plastic, the control arm portion 2.1 is in principle designed to be rigid (under forces normally occurring, there is no or only negligible deformation thereof), while the spring portion 2.2 is elastic, so it bends elastically under a pivot movement of the control arm portion 2.1. The return force occurring on bending serves as a spring force for the wheel suspension 1.

According to one example, the spring portion 2.2 connects to the control arm portion 2.1 in the region of the pivot axis S. In other words, the distance of the wheel connecting point 3 from the pivot axis S is substantially larger than the distance of the transitional region 2.3 where the spring portion 2.2 connects to the control arm portion 2.1. The first distance may for example, be four times the size of the latter, whereby the transitional region 2.3 lies in a subframe-quarter of the control arm portion 2.1. Typically, the transitional region 2.3 and the wheel connecting point 3 lie on the same side of the pivot axis S, but they may also lie on different sides.

Spring portion 2.2 function cannot normally be achieved if this is blocked at the vehicle subframe 30. Constructions are conceivable where the spring connecting point or retainer 6 is arranged pivotally, slidably, and/or displaceably on the vehicle subframe 30. In the disclosed example, the spring connecting point 6 is an elastic mount, such that in the region of the spring connecting point 6 an elastic bearing is provided, for example a rubber bearing. The spring portion 6 may, in some cases, be held by rubber only at the sides that extend transversely to the pivot axis S, since normally no forces or displacement is expected in the direction of the pivot axis. For example, the spring connecting point 6 may include rubber elements 10, 11 arranged on opposite sides, one of which 11 lies directly on the vehicle subframe 30 and the other 10 secured by a metal plate 12, secured to the vehicle subframe 30 with a clamp or a screw connection 13, 14.

The spring portion 2.2 may be configured in the manner of a leaf spring where its longitudinal extension between the control arm portion 2.1 and the spring connecting point 6 is greater than its dimension transversely thereto, in other words the spring portion 2.2 is elongated. The spring portion 2.2 has a greater transverse dimension in the direction of the pivot axis than transversely to the pivot axis. Due to the comparatively small transverse dimension transversely to the pivot axis S, the spring portion is relatively flexible against bending moments in relation to the pivot axis S. Since the control arm portion 2.1 is rigid and the spring portion 2.2 elastic, the control arm portion has a transverse dimension, transversely to the pivot axis S, greater than a transverse dimension of the spring portion transversely to the pivot axis S. The term "transverse dimension" refers to a direction transverse to the longitudinal extension, which in the case of the spring portion 2.2 is defined by the extension from the control arm portion 2.1 to the spring connecting point 6 and in the case of the control arm portion 2.1 by the extension from the pivot axis S to the wheel connecting point 3.

As evident from FIG. 1, the transverse dimension (or thickness) of the spring portion 2.2 transversely to the pivot axis S (in other words along the Y-axis) is smaller than the transverse dimension of the control arm portion 2.1 (along the Z-axis). For this reason, the control arm portion 2.1 is substantially more resistant to bending than the spring portion 2.2. In addition, the stiffness may be influenced further by the composition, density, and orientation of the embedded fibers, which may be selected differently in the control arm portion 2.1 and in the spring portion 2.2. It is also conceivable to use at least partially different plastics in the two portions 2.1 and 2.2.

As is also evident from the section views of FIGS. 2 and 3, the transverse dimension of the spring portion 2.2 is greater in the direction of the pivot axis S than transversely thereto. The spring portion 2.2 is formed in the manner of a leaf spring.

On suspension compression of the wheel carrier 20, the transitional region 2.3 is exposed to particular loads. To reinforce the structure of the control arm unit 2, a steel insert 15 is embedded which has a substantially T-shaped cross section, where it extends both into the control arm portion 2.1 and into the spring portion 2.2.

In one example, a material fit between the control arm portion 2.1 and the spring portion 2.2 creates a rigid connection. The control arm portion 2.1 and spring portion 2.2 may be glued together or welded by ultrasound. In one example, the spring portion 2.2 is produced integrally with the control arm portion 2.1. Thus, the production process does not entail producing two separate parts that must then be connected together. Rather only a single part is produced providing numerous advantages since no production tolerances need not be considered for the connecting region and the production steps for preparation and performance of a connection are not required. The control arm unit 2 can normally be produced substantially more economically. It must be noted that, despite the production of the control portion 2.1 and spring portion 2.2 as one component, the material properties of the spring portion 2.2 can be set largely independently of those of the control arm portion 2.1, in that the packing density, orientation and/or composition of the embedded fibers, and where applicable the composition of the plastic matrix, can be varied.

Production of the control arm unit 2 is comparatively simple and may for example substantially include impregnation and recasting of a prepared fiber structure in a mold. The insert 15 may be enclosed by the plastic material in the same working step. Similarly, for example, parts of the ball joint 9 and/or pivot bearings 7, 8 may be enclosed directly in the plastic. Alternatively, for rubber components it is possible for these to be vulcanized in or on, after the forming process. As an alternative to a steel insert 15, it is also possible to embed ceramic or light alloy components in the plastic matrix to achieve local reinforcement. Components of a different type of plastic may also be embedded.

The control arm portion 2.1 need not be formed as a closed, solid structure but it may have cavities and/or recesses, or reinforcing ribs may be formed on its surface, by means of which it is strengthened in a weight- and material-saving manner. Where suitable, corresponding structures may also be worked into the spring portion 2.2.

According to one example, at least one component of another material is embedded in regions in the fiber-reinforced plastic. This may be the fiber-reinforced plastic of the spring portion 2.2 and/or that of the control arm portion 2.1. The term "embedded" means that the component is at least partly surrounded by fiber-reinforced plastic, sometimes a portion of the component may lie on the surface. Normally, the component is connected to the fiber-reinforced plastic by material fit. The term "component" here means a part, component, or element. Here, at least one component may include metal, ceramic, rubber, or a further plastic (which differs from the material of the matrix of the fiber-reinforced plastic). Such components, in particular made of metal or ceramic, allow local reinforcement of regions of the control arm unit 2, providing strength or stiffness. This could be described as a hybrid construction of the control arm unit 2. This embodiment includes designs where for example a bearing sleeve is made of metal and embedded in the fiber-reinforced plastic during the production process. The metal may be steel or light alloys like aluminum. Also, a component of rubber (for example a bearing bush) may be vulcanized into the fiber-reinforced plastic after or during the forming process.

There are many possible ways of providing components, for example of metal or ceramic, to reinforce certain regions of the control arm unit. In particular, the region where the spring portion transforms into the control arm portion may be exposed to particular loading. Therefore, according to one example, the component is arranged in a transitional region from the control arm portion 2.1 to the spring portion 2.2 to reinforce the transitional region 2.3. If for example, the spring portion 2.2 branches from the control arm portion 2.1 at a particular angle to give a T-shape, a component also T-shaped may be embedded in the transitional region 2.3 and reinforce this region.

For reasons of simplicity, FIGS. 1-3 do not show a longitudinal control arm. This is evidently usually also part of the wheel suspension 1. Furthermore, optionally additional transverse control arms may be provided, for example an upper transverse control arm that sits above the wheel hub 21 on the wheel carrier 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension for a motor vehicle comprising:
a control arm including a control arm portion and a spring portion;
said control arm portion made at least partly of fiber-reinforced plastic and having a wheel connecting point for a wheel carrier and at least one superstructure connecting point for a vehicle superstructure, for mounting pivotally about a pivot axis;
said spring portion made at least partly from fiber-reinforced plastic and rigidly connected by a moment resisting connection to the control arm portion; and
a spring connecting point spaced from said pivot axis connecting said spring portion to the vehicle superstructure.

2. The wheel suspension of claim 1, wherein the spring portion and the control arm portion form a unitary member.

3. The wheel suspension of claim 1 wherein the control arm is a transverse control arm, wherein the pivot axis corresponds to a longitudinal axis of the motor vehicle.

4. The wheel suspension of claim 1 wherein the spring connecting point is arranged above the pivot axis.

5. The wheel suspension of claim 1 wherein the spring portion includes a linear portion extending at an angle between 60° and 120° over a plane running through the pivot axis and the wheel connecting point.

6. The wheel suspension of claim 1 wherein the spring portion is connected to the control arm portion in the region of the pivot axis.

7. The wheel suspension of claim 1 wherein the spring connecting point is mounted elastically on the vehicle superstructure.

8. The wheel suspension of claim 1 wherein at least one component of another material is embedded in regions in the fiber-reinforced plastic.

9. The wheel suspension of claim 8 wherein the component is arranged in a transitional region from the control arm portion to the spring portion to reinforce the transitional region.

10. A wheel suspension for a motor vehicle comprising:
a control arm including a control arm portion and a spring portion;
said control arm portion made at least partly of fiber-reinforced plastic and having a wheel connecting point for a wheel carrier and at least one superstructure connecting point for a vehicle superstructure, for mounting pivotally about a pivot axis;

said spring portion made at least partly from fiber-reinforced plastic and connected rigidly by material fit to the control arm portion;

a spring connecting point spaced from said pivot axis connecting said spring portion to the vehicle superstructure; and wherein the spring portion has a greater transverse dimension in the direction of the pivot axis than transversely to the pivot axis.

11. A wheel suspension comprising:

a control arm having a control arm portion;

a spring portion, including a linear portion having an end fixed against translation and rotation to the control arm portion; and a retainer spaced from the control arm connecting said spring portion to a vehicle subframe.

12. The wheel suspension of claim 11 wherein said spring portion is made at least partly of fiber-reinforced plastic.

13. The wheel suspension of claim 11 wherein the spring portion the control arm portion are a unitary member.

14. The wheel suspension of claim 11 wherein the linear portion of the spring portion extends outwardly from said control arm portion at an angle between 60° and 120° relative to an axis of said control arm extending between a pivot axis of said control arm and a wheel connecting point of said control arm.

15. The wheel suspension of claim 11 including a spring connecting point above a pivot axis of the control arm and the linear portion of the spring portion is fixed to the control arm portion near said pivot axis.

16. The wheel suspension of claim 11 wherein the spring portion is made at least partly of fiber-reinforced plastic and at least one component of a material other than fiber-reinforced plastic is embedded in the control arm portion in an area adjacent the spring portion.

17. The wheel suspension of claim 16 wherein the component is arranged in a transitional region of the control arm to reinforce the transitional region and extends both into the control arm portion and the spring portion.

18. A wheel suspension comprising:

a control arm having a control arm portion and a cantilever spring portion fixed to the control arm portion; and a retainer spaced from the control arm connecting said cantilever spring portion to a vehicle subframe wherein the cantilever spring portion has a greater dimension in the direction of a pivot axis of the control arm than in the direction transverse the pivot axis.

* * * * *